US008706345B2

(12) United States Patent
Bucci et al.

(10) Patent No.: US 8,706,345 B2
(45) Date of Patent: Apr. 22, 2014

(54) STARTER RELAY STRUCTURE FOR AUTO-STARTING

(75) Inventors: Andrew M. Bucci, Hilliard, OH (US); Toshio Hayashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 700 days.

(21) Appl. No.: 12/963,743

(22) Filed: Dec. 9, 2010

(65) Prior Publication Data

US 2012/0150382 A1 Jun. 14, 2012

(51) Int. Cl.
| G01M 17/00 | (2006.01) |
| G06F 7/00 | (2006.01) |
| G06F 11/30 | (2006.01) |
| G06F 19/00 | (2011.01) |
| G07C 5/00 | (2006.01) |

(52) U.S. Cl.
USPC ......... 701/29.6; 701/34.4; 307/9.1; 307/10.3; 307/10.6; 361/166; 361/191

(58) Field of Classification Search
USPC ............... 701/29.6, 34.4, 67; 307/10.1, 10.3, 307/10.6, 9.1; 361/166, 199
See application file for complete search history.

(56) References Cited

U.S. PATENT DOCUMENTS

| 3,893,007 | A | * | 7/1975 | Mori ................................. 361/1 |
| 4,082,992 | A | * | 4/1978 | Day ............................. 320/117 |
| 4,131,304 | A | * | 12/1978 | Wagner ....................... 290/38 C |
| 4,316,095 | A | * | 2/1982 | Laffoon et al. ............. 290/38 R |
| 5,026,335 | A | * | 6/1991 | Oftedal et al. ................ 475/198 |
| 5,180,924 | A | * | 1/1993 | Rudisel ........................ 307/10.6 |
| 5,186,308 | A | * | 2/1993 | Munro .......................... 198/572 |
| 5,451,820 | A | * | 9/1995 | Gotoh et al. ................. 307/10.6 |
| 6,909,285 | B2 | | 6/2005 | Jordan et al. |
| 7,287,501 | B2 | | 10/2007 | Yamada |
| 7,368,829 | B2 | * | 5/2008 | Tezuka ........................... 307/9.1 |
| 8,079,340 | B2 | * | 12/2011 | Okumoto et al. ........... 123/179.4 |
| 8,110,939 | B2 | * | 2/2012 | Itou ............................. 307/10.6 |
| 2010/0090526 | A1 | * | 4/2010 | Itou ............................. 307/10.6 |
| 2010/0251852 | A1 | * | 10/2010 | Murata et al. ................... 74/7 A |
| 2010/0282200 | A1 | * | 11/2010 | Notani et al. ............... 123/179.3 |
| 2010/0299053 | A1 | * | 11/2010 | Okumoto et al. ............. 701/113 |
| 2012/0091793 | A1 | * | 4/2012 | Kigoshi et al. ............... 307/10.1 |

* cited by examiner

Primary Examiner — Khoi Tran
Assistant Examiner — Rachid Bendidi
(74) Attorney, Agent, or Firm — Fay Sharpe LLP (57) ABSTRACT

A starter relay structure for a vehicle, where an electronic control unit of the vehicle controls the starter relay structure. The starter relay structure comprises a first relay and a second relay activated by an ignition signal from the electronic control unit. The starter relay structure further include a third relay activated by an output of the second relay, where an output of the first relay is provided as an input to the third relay.

20 Claims, 5 Drawing Sheets

FIG. 5

STARTER RELAY STRUCTURE FOR AUTO-STARTING

BACKGROUND

The present exemplary embodiments relate generally to vehicles. They find particular application in conjunction with starting systems, and will be described with particular reference thereto. However, it is to be appreciated that the present exemplary embodiments are also amenable to other like applications.

One-touch starting systems are designed to start a vehicle when a "start" button is pressed. Namely, when the start button is pressed, such systems crank an engine of the vehicle until the engine is started. During the period when the engine is cranking, a driver of the vehicle generally need not hold the button. Rather, the driver can release the button and the engine will continue cranking.

Some manual transmission vehicles having one-touch starting systems include a clutch switch that needs to be activated to start the vehicle. The clutch switch is generally activated when a clutch is depressed. If the clutch switch is not activated, a power control unit (PCU) may not provide a start request to an electronic control unit (ECU) and/or power needed by the ECU to start the vehicle. Further, starter relays of the vehicle may be disabled.

The ECU generally controls the starter relays via a relay signal. So as to ensure the one-touch starting system functions properly, the ECU generally monitors the relay signal (i.e., a feedback loop). However, using typical arrangements of starter relays, the ECU is prone to interference (e.g., leakage current) from the PCU. This interference is generally by way of the clutch switch and can lead to false readings regarding the relay signal and/or unintended cranking of the engine.

Beyond manual transmission vehicles, some automatic transmission vehicles require the vehicle to be in "Park" or "Neutral" to start. Namely, if the vehicle is not in "Park" or "Neutral", an ECU may prevent activation of starter relays of the vehicle. To make such a determination, one or more automatic transmission switches are generally employed. The automatic transmission switches may include a switch for each of one or more gear positions of the automatic transmission and/or an inhibitor switch, where the inhibitor switch is activated when the vehicle is in "Park" or "Neutral".

Whether the ECU prevents activation of the starter relays depends upon the validity of switch input from the automatic transmission switches associated with "Park" and "Neutral". However, in certain situations, such dependence may prove problematic and the ECU may activate the starter relays notwithstanding that the vehicle is not in park or neutral. As should be appreciated, this may lead to unintended cranking of the engine, which may damage the vehicle.

The present disclosure contemplates new and improved systems and/or methods for remedying these and other problems.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one aspect of the present disclosure a starter relay structure for a vehicle is provided. An electronic control unit of the vehicle controls the starter relay structure. The starter relay structure comprises a first relay and a second relay activated by a relay signal from the electronic control unit. The starter relay structure further include a third relay activated by an output of the second relay, where an output of the first relay is provided as an input to the third relay.

According to another aspect of the present disclosure, a starter system for a vehicle is provided. The system comprises a clutch switch and an electronic control unit and a power control unit that both monitor the clutch switch. The system further comprises a relay unit that isolates the clutch switch between the electronic control unit and the power control unit.

According to another aspect of the present disclosure, a starter system for an automatic transmission vehicle is provided. The system includes an inhibitor switch, an electronic control unit and a relay unit. The inhibitor switch activates when a transmission of the automatic transmission vehicle is one of park and neutral. The electronic control unit starts the automatic transmission vehicle and facilitates diagnosis of the starter system. The relay unit a first relay, a second relay and a third relay. The first relay and the second relay are activated by an ignition signal and a plurality of relay signals from the electronic control unit. The third relay is activated by a combination of an output of the second relay and the inhibitor switch.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

One or more embodiments or implementations are hereinafter described in conjunction with the drawings, where like reference numerals are used to refer to like elements throughout, and where the various features are not necessarily drawn to scale.

Figure 1:
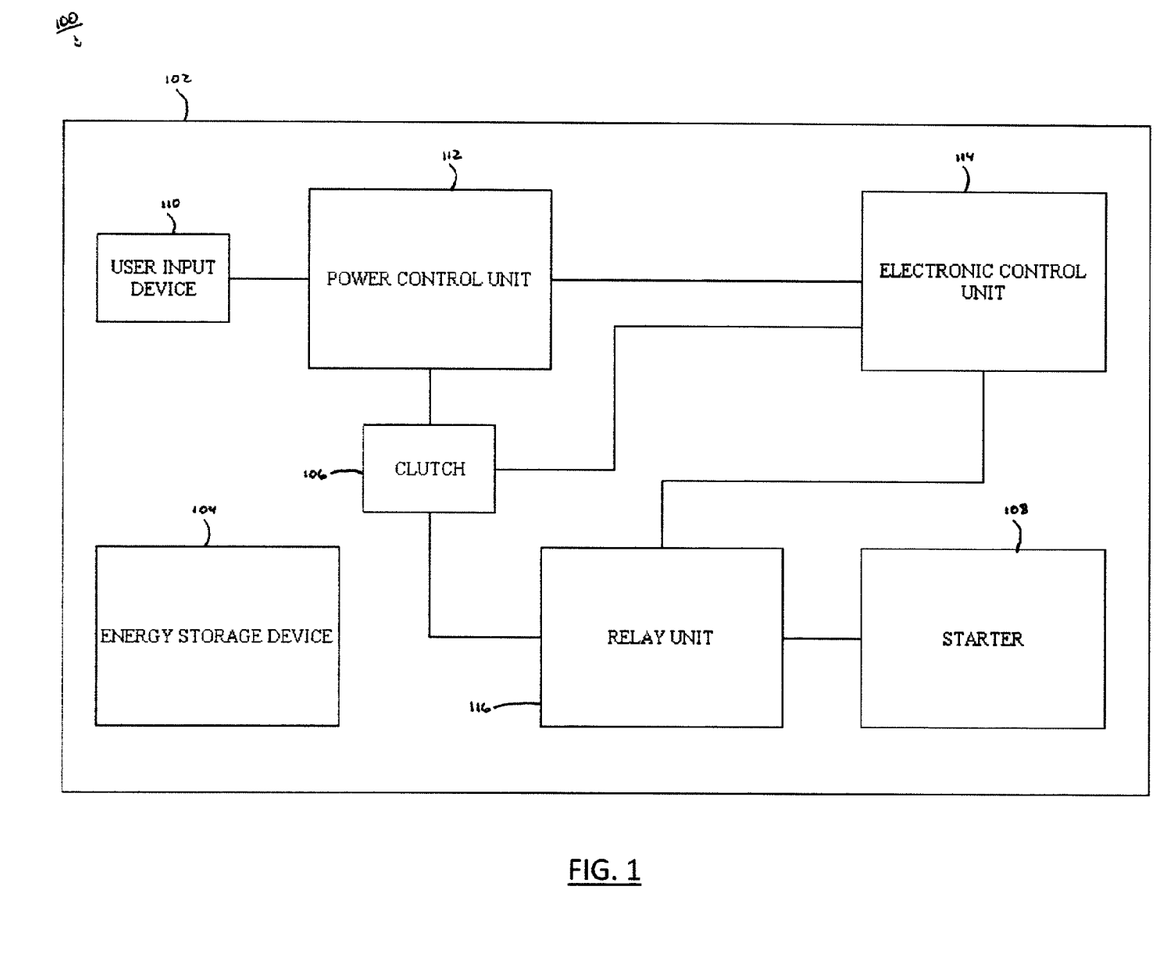
FIG. 1 is a block diagram of a one-touch starting system for a manual transmission vehicle according to aspects of the present disclosure.

With reference to FIG. 1, a one-touch starting system 100 for a manual transmission vehicle 102 is illustrated. The vehicle may include a truck, a car, a bus, a motorcycle, and the like. The system 100 may include one or more of an energy storage device 104, a clutch 106, a starter 108, a user input device 110, a power control unit 112, an electronic control unit 114, a relay unit 116, and the like.

The energy storage device 104 provides power to the other components of the system 100. The energy storage device 104 may include one or more of a battery, a capacitor, a flywheel or an accumulator, and the like. However, the energy storage device 104 suitably includes a car battery providing a direct current voltage (e.g., 12.5-12.8V).

The clutch 106 facilitates shifting between gears in a manual transmission vehicle and suitably includes means for detecting whether the clutch 106 is depressed. Such means may include, for example, a switch tied to the clutch, where the switch is closed when the clutch 106 is depressed and open when the clutch 106 is released. As another example, sensors, optical or otherwise, may be employed to determine the state of the clutch 106.

The starter 108 provides the necessary mechanical energy to crank an engine of the vehicle 102 and suitably includes an electric motor. However, the starter 108 may include other means of cranking the engine of the vehicle 102.

The user input device 110 allows an operator of the vehicle 102 to selectively provide the power control unit 112 with a start request. Suitably, the user input device 110 includes a button, where pressing the button generates the start request. However, it is to be appreciated that the user input device 110 may include other means of selectively generating the start request. For example, a wireless remote control may be employed to allow an operator of the vehicle 102 to remotely generate the start request. As another example, turning a key in an ignition may generate the start request.

The power control unit 112 provides the electronic control unit 114 with the necessary power to activate the relay unit 116. This power may be from the energy storage device 104 and/or provided only upon the satisfaction of one or more conditions. The one or more conditions may include one or more of authentication from an operator of the vehicle 102, depression of the clutch 106, activation of brakes of the vehicle, and the like.

Authentication suitably occurs upon bringing a key associated with the vehicle 102 within the vehicle 102, where the vehicle 102 verifies the key is associated with the vehicle 102 wirelessly. However, other means of authentication are equally amenable. For example, authentication may occur by inserting the key associated with the vehicle 102 within an ignition.

The power control unit 112 further provides the electronic control unit 114 with a start request. Suitably, the start request is provided only upon the satisfaction of one or more conditions. These conditions may include one or more of a start request from the user input device 110, authentication from an operator of the vehicle 102, depression of the clutch 106, activation of brakes of the vehicle, and the like. As should be appreciated, these conditions may parallel the conditions for providing power to the electronic control unit 114.

The electronic control unit 114 controls the relay unit 116 to start the engine of the vehicle 102 by providing the relay unit 116 with the power received from the power control unit 112. In certain embodiments, the electronic control unit 114 may require the satisfaction of one or more conditions before providing the power received from the power control unit 112 to the relay unit 116. These conditions may include receiving a start request from the power control unit 112, a nominal diagnosis for the relay unit 116, depression of the clutch 106, and the like.

In certain embodiments, the electronic control unit 114 may monitor one or more of the relay unit 116, the power provided to the relay unit 116, and the like. As to monitoring the relay unit 116, the electronic control unit 114 may monitor relays of the relay unit 116 for welding (i.e., a relay becoming stuck in the ON position). As to monitoring the power provided to the relay unit 116, the electronic control unit 114 may monitor the power to ensure it is properly controlling the relay unit 116.

The relay unit 116 controls the starter 108 and isolates the electronic control unit 114 from interference from the power control unit 112. In certain embodiments, the relay unit 116 may be disabled until the clutch 106 is depressed. Additionally, or alternatively, in certain embodiments, the relay unit 116 may include one or more relays facilitating control of the starter 108 and/or isolating the electronic control unit 114 and the power control unit 112. For example, the relays may include three relays.

In embodiments employing a three relay configuration, a first relay and a second relay may be activated by the power received from the electronic control unit 114, where the input to the first relay and the input to the second relay are electrically coupled to the energy storage device 104. Further, a third relay may be activated by the output of the second relay and take the output of the first relay as input, and the output of the third relay may activate the starter 108.

Figure 2:
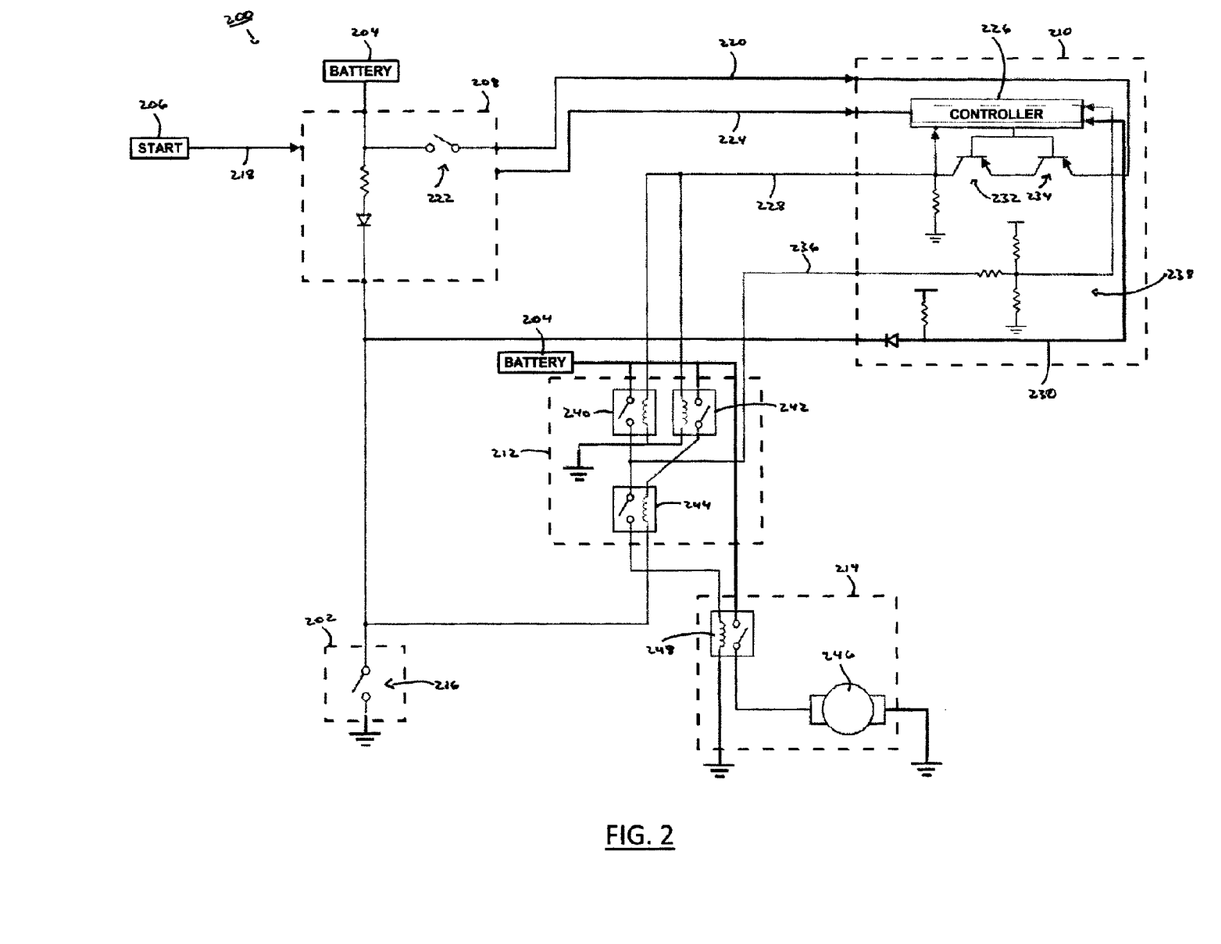
FIG. 2 is a schematic view of a one-touch starting system for a manual transmission vehicle according to aspects of the present disclosure.

With reference to FIG. 2, a schematic view of a one-touch starting system 200 for a manual transmission vehicle is illustrated. The one-touch starting system 200 is a more specific embodiment of the one-touch starting system 100 of FIG. 1. Therefore, the discussion heretofore is equally amenable to the discussion to follow and components described hereafter are to be understood as paralleling like components discussed heretofore, unless noted otherwise. The one-touch starting system 200 may include one or more of a clutch 202, an energy storage device 204, a user input device 206, a power control unit 208, an electronic control unit 210, a relay unit 212, a starter 214, and the like.

The clutch 202 facilitates shifting between gears in a manual transmission vehicle and, suitably, must be depressed to start the vehicle. The clutch 202 may include a clutch switch 216, where the clutch switch 216 is closed when the clutch 202 is depressed and open when the clutch 202 is released.

The energy storage device 204 provides power to the other components of the system 200. The energy storage device 204 may include one or more of a battery, a capacitor, a flywheel or an accumulator, and the like. However, the energy storage device 204 suitably includes a car battery providing a direct current voltage (e.g., 12.5-12.8V).

The user input device 206 allows an operator of the vehicle to selectively provide the power control unit 208 with a start request via a start signal 218. The user input device 206 suitably includes a button, where pressing the button generates the start request, but other means of generating the start request are equally amenable. In certain embodiments, the user input device 206 may be mounted to the console of the vehicle.

The power control unit 208 provides the electronic control unit 210 with the necessary power to activate the relay unit 212 via an ignition signal 220. The power control unit 208 may selectively provides this power to the electronic control unit 210 by way of a switch 222. In certain embodiments, the switch 222 may be activated upon the satisfaction of one or more conditions, such as one or more of authentication of the operator of the vehicle, depression of the clutch 202, and the like.

The power control unit 208 further provides the electronic control unit 210 with a start request via a start signal 224. Suitably, such a request is provided to the electronic control unit 210 upon the satisfaction of one or more conditions, such as receipt of a start request from the user input device 206.

The electronic control unit 210 controls the relay unit 212 to start the engine of the vehicle and includes a controller 226. The controller 226 suitably coordinates with components of the vehicle to start the vehicle and may include a processor and a storage medium, where the processor executes executable instructions on the storage medium to start the vehicle. Further, the controller 226 suitably requires satisfaction of one or more conditions before starting the vehicle. These conditions may include one or more of receipt of a start request from the power control unit 208, depression of the clutch 202, and the like.

In embodiments requiring depression of the clutch 202, the controller 226 suitably monitors the clutch switch 216 of the clutch 202 via a clutch signal 230. The clutch signal 230 will generally be pulled high when the clutch switch 216 is open and pulled low when the clutch switch 216 is closed.

To start the vehicle, the controller 226 may provide the power received from the power control unit 208 to the relay unit 212 via a relay signal 228. In certain embodiments, two transistors 232, 234 connected in series with the ignition signal 220 and the relay signal 228 are employed to allow the power received from the power control unit 208 to be selectively provided to the relay unit. In such embodiments, the ignition signal 220 and the relay signal 228 will be one and the same when the transistors 230, 232 are active, and the relay signal 228 will be pulled low otherwise.

In certain embodiments, the controller 226 may further monitor one or more of the relay unit 212, the relay signal 228 provided to the relay unit 212, and the like to ensure the vehicle starts properly and/or is functioning properly. If problems are detected, the controller 226 may prevent startup of the vehicle and/or terminate an existing attempt to start the vehicle.

As to monitoring the relay unit 212, the controller 226 may monitor the relay unit 212 via a diagnosis signal 236 received therefrom. Suitably, the monitoring entails looking for welded relays (i.e., relays stuck in the ON position). If the relay unit 212 is functioning properly, the diagnosis signal 236 will suitably have a voltage (e.g., 2.5V) designated by an input circuit 238. However, if the relay unit 212 is not functioning properly, the diagnosis signal 236 will suitably by pulled high or low.

As to monitoring the relay signal 228, the controller 226 may monitor the relay signal 228 provided to the relay unit 212 so as to ensure the relay signal 228 is as expected. If problems are detected, the controller 226 may end its attempt to start the vehicle. As noted above, in existing starting systems, a power control unit can interfere with the relay signal 228, thereby causing the unexpected results.

The relay unit 212 provides power to the starter 214 and is suitably activated by the correct combination of states of one or more of the electronic control unit 210, the clutch 202, and the like. Namely, the relay unit 212 suitably requires the clutch switch 216 to be activated and the electronic control unit 210 to instruct the relay unit 212 to start the vehicle. The instructions may be passed by way of the relay signal 228.

To provide power to the starter 214, the relay unit 212 suitably includes three relays configured to isolate the power control unit 208 from the electronic control unit 210. In such embodiments, a first relay 240 and a second relay 242 of the relay control unit 212 may be configured to activate based on the relay signal 228 from the electronic control unit 210; the inputs to the first relay 240 and the second relay 242 may be provided power from the energy storage device 204; the output of the first relay 240 may be used to provide power to the input of a third relay 244; the output of the second relay 242, in conjunction with the clutch switch 216, may be used to activate the third relay 244; and the output of the third relay 244 may used to activate the starter 214.

In certain embodiments, the relay unit 212 may further provide the electronic control unit 210 with the diagnosis signal 236. Suitably, the diagnosis signal 236 is the input of the third relay 244 and/or the output of the first relay 240. Using the diagnosis signal 236, the electronic control unit 210 can detect failures with the relays.

Assuming the vehicle is not attempting to start and the clutch 202 is activated, the diagnosis signal 236 will be pulled high and/or pulled low when one or more of the first relay 240, the second relay 242, and the third relay 244 become stuck in the ON position (i.e., welded). As to the first relay 240, the diagnosis signal 236 will be pulled high if the first relay 240 becomes stuck in the ON position. As to the second relay 242 and the third relay 244, the diagnosis signal 236 will be pulled low if the second relay 242 or the third relay 244 become stuck in the ON position.

Figure 3:
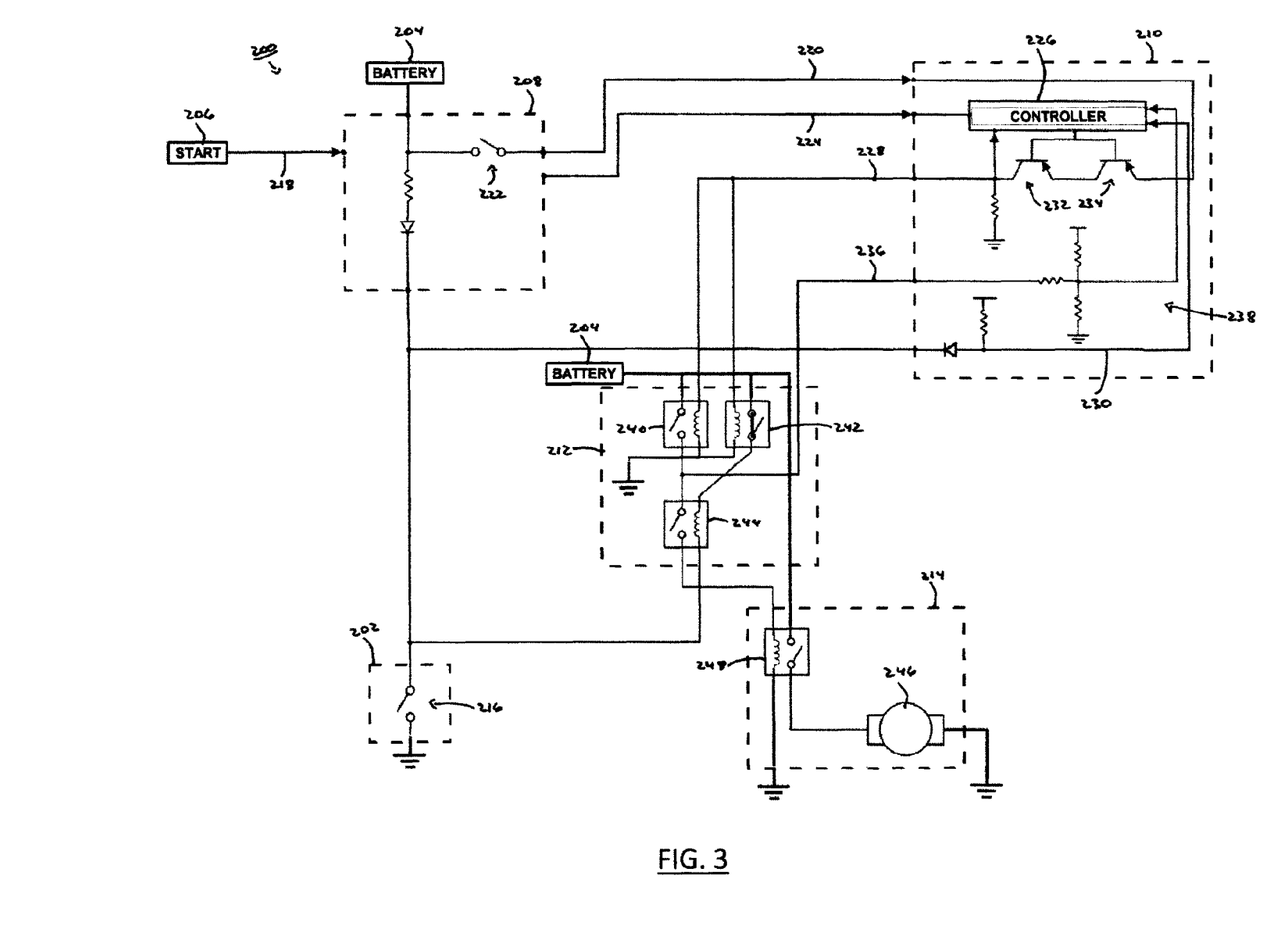
FIG. 3 is an illustration of a failure of a relay of the one-touch starting system of FIG. 2.

Referring to FIG. 3, a failure of the second relay 242 is illustrated. Therein, one will note the second relay 242 has become welded (i.e., stuck in the ON position). Assuming the clutch 202 is activated, the third relay 244 will be in the ON position, since the second relay 242 is in the ON position. When the third relay 244 is in the ON position, it pulls the diagnosis signal 236 low. The electronic control unit 210 can then detect that one of the relays 240, 242, 244 is activated and take appropriate action.

Referring back to FIG. 2, it should be appreciated that this configuration of the relay unit 212 advantageously allows isolation of the power control unit 208 from the electronic control unit 210. Namely, the relay signal 228 of the electronic control unit 210 does not interact with the clutch switch 216, whereby interference from the power control unit 208 is minimal. Further, this configuration does not require any additional hardware to detect failures in the relay unit 212.

The starter 214 provides the necessary mechanical energy to crank the engine of the vehicle and suitably includes a motor 246 and a relay 248, where the relay 248 provides power received from the energy storage device 204 to the motor 246. In certain embodiments, the relay 248 may be activated by the output of the third relay 244.

Figure 4:
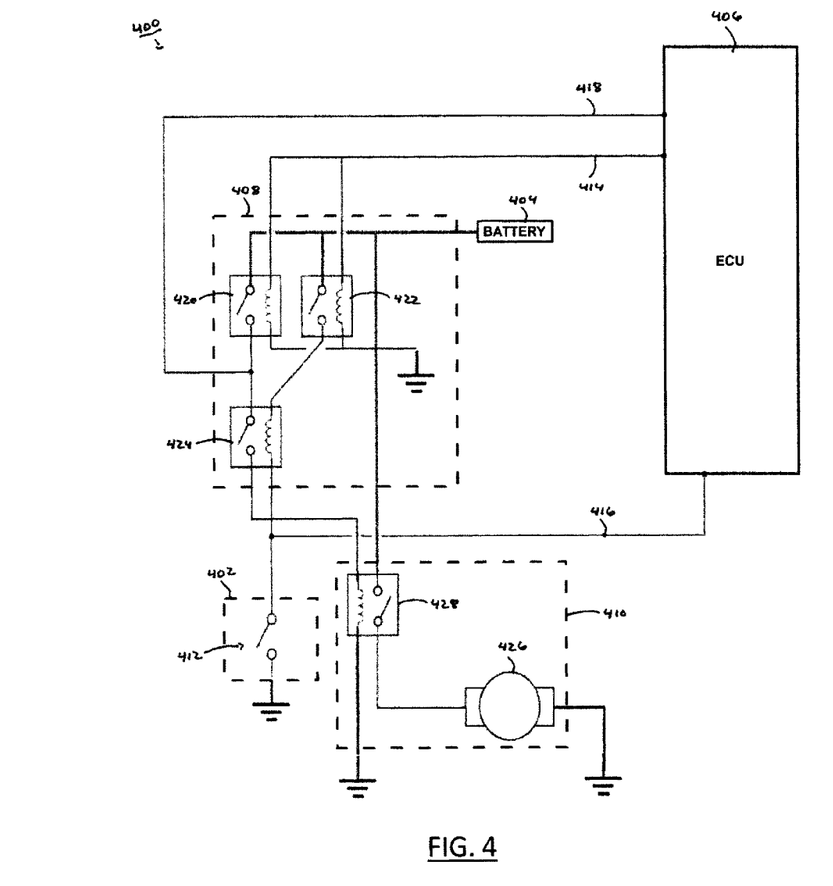
FIG. 4 is a schematic view of a starting system for a manual transmission vehicle according to aspects of the present disclosure; and, FIG. 5 is a schematic view of a starting system for an automatic transmission vehicle according to aspects of the present disclosure.

With reference to FIG. 4, a schematic view of a starting system for a manual transmission vehicle is provided. Components described hereafter are to be understood as paralleling like components discussed heretofore, unless noted otherwise. The starting system 400 may include one or more of a clutch 402, an energy storage device 404, an electronic control unit 406, a relay unit 408, a starter 410, and the like.

The clutch 402 facilitates shifting between gears in a manual transmission vehicle and, suitably, must be depressed to start the vehicle. The clutch 402 may include a clutch switch 412, where the clutch switch 412 is closed when the clutch 402 is depressed and open when the clutch 402 is released.

The energy storage device 404 provides power to one or more components of the starting system 400. The energy storage device 404 suitably includes a typical car battery, but other energy sources are equally amenable. Further, the energy storage device 404 suitably provides a direct current voltage ranging from 12.5V to 12.8V, but other voltages are equally amenable.

The electronic control unit 406 controls the relay unit 408 to start the engine of the vehicle and suitably coordinates with components of the vehicle to start the vehicle. To start the vehicle, the electronic control unit 406 may provide power received from an external source, such as the energy storage device 404 or a power control unit, to the relay unit 408 via a relay signal 414. As with the electronic control unit 210 of FIG. 2, this may be facilitated by way of one or more transistors.

In certain embodiments, the electronic control unit 406 may require satisfaction of one or more conditions before starting the vehicle. These conditions may include one or more of receipt of a start request from an external source, depression of the clutch 402, and the like. The external source may include, for example, a power control unit or a user input device.

In embodiments requiring depression of the clutch 402, the electronic control unit 406 suitably monitors the clutch switch 412 of the clutch 402 via a clutch signal 416. The clutch signal 416 will generally be pulled high when the clutch switch 412 is open and pulled low when the clutch switch 412 is closed.

To ensure a proper startup of the vehicle, the electronic control unit 406 may monitor one or more of the relay unit 408 and the relay signal 414. If problems are detected, the electronic control unit 406 may prevent startup of the vehicle and/or terminate an existing attempt to start the vehicle.

As to monitoring the relay unit 408, the electronic control unit 406 monitors the relay unit 408 via a diagnosis signal 418 received therefrom. Suitably, the monitoring entails looking for welded relays (i.e., relays stuck in the ON position). If the relay unit 408 is functioning properly, the diagnosis signal 418 will suitably have a voltage (e.g., 2.5V) designated by an input circuit of the electronic control unit 406. However, if the relay unit 408 is not functioning properly, the diagnosis signal 418 will suitably by pulled high or low.

As to monitoring the relay signal 414 the electronic control unit 406 may monitor the relay signal 414 provided to the relay unit 408 so as to ensure the relay signal 414 is as expected. If problems are detected, the electronic control unit 406 may end its attempt to start the vehicle.

The relay unit 408 provides power to the starter 410 and is suitably activated by the electronic control unit 406 via the relay signal 414. To facilitate this, the relay unit 408 may include three relays: a first relay 420, a second relay 422, and a third relay 424. Suitably, in such embodiments, the first relay 420 and the second relay 422 of the relay control unit 408 may be configured to activate based on the relay signal 414 from the electronic control unit 406; the inputs to the first relay 420 and the second relay 422 may be provided power from the energy storage device 404; the output of the first relay 420 may be used to provide power to the input of the third relay 424; the output of the second relay 422, in conjunction with the clutch switch 412, may be used to activate the third relay 424; and the output of the third relay 424 may be used to activate the starter 410.

In certain embodiments, the relay unit 408 may further provide the electronic control unit 406 with the diagnosis signal 418. Suitably, the diagnosis signal 418 is the input of the third relay 424 and/or the output of the first relay 420. Using the diagnosis signal 418, the electronic control unit 406 can detect failures with the relays.

Assuming the vehicle is not attempting to start and the clutch 402 is activated, the diagnosis signal 418 will be pulled high and/or pulled low when one or more of the first relay 420, the second relay 422, and the third relay 424 become stuck in the ON position (i.e., welded). As to the first relay 420, the diagnosis signal 418 will be pulled high if the first relay 420 becomes stuck in the ON position. As to the second relay 422 and the third relay 424, the diagnosis signal 418 will be pulled low if the second relay 422 or the third relay 424 become stuck in the ON position.

The starter 410 provides the necessary mechanical energy to crank the engine of the vehicle and suitably includes a motor 426 and a relay 428, where the relay 428 provides power received from the energy storage device 404 to the motor 426. In certain embodiments, the relay 428 may be activated by the output of the third relay 424.

Figure 5:
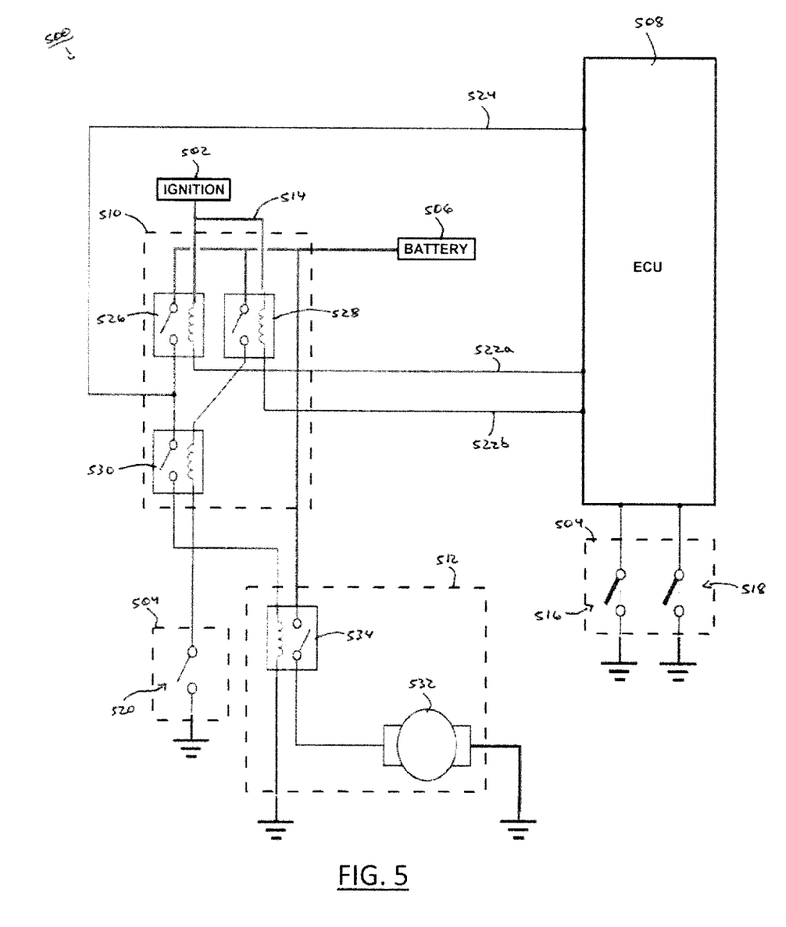

With reference to FIG. 5, a schematic view of a starting system 500 for an automatic transmission vehicle is provided. Components described hereafter are to be understood as paralleling like components discussed heretofore, unless noted otherwise. The starting system 500 may include one or more of an ignition 502, an automatic transmission 504, an energy storage device 506, an electronic control unit 508, a relay unit 510, a starter 512, and the like.

The ignition 502 provides the relay unit 510 with power to activate the starter 512 via an ignition signal 514. This power alone is not sufficient to activate the relay unit 510, but it is necessary. The ignition 502 may include one or more of a switch, an ignition switch, a power control unit, a user input device, and the like. In certain embodiments, the ignition 502 may provide the relay unit 510 with power from the energy storage device 506.

The automatic transmission 504 facilitates automatic shifting between gears of the vehicle. The automatic transmission 504 suitably includes one or more automatic transmission switches. The automatic transmission switches may include a switch for each of one or more gear positions (such as park, neutral, first gear, etc.) of the automatic transmission 504, where these switches may be activated when the automatic transmission 504 is in their associated position. For example, the automatic transmission switches may include a park switch 516 and/or a neutral switch 518. The automatic transmission switches may further include an inhibitor switch 520, where the inhibitor switch 520 is activated when the vehicle is in "Park" or "Neutral".

The energy storage device 506 provides power to one or more components of the starting system 500. The energy storage device 506 suitably includes a typical car battery, but other energy sources are equally amenable. Further, the energy storage device 506 suitably provides a direct current voltage ranging from 12.5V to 12.8V, but other voltages are equally amenable.

The electronic control unit 508 instructs the relay unit 510 to start the engine of the vehicle. Suitably, this is prompted by a start request from an external source (not shown), such as one or more of a power control unit, a user input device, an ignition switch, and the like. In certain embodiments, the electronic control unit 508 may require certain conditions to be met before instructing the relay unit 510 to start the engine of the vehicle, notwithstanding that it may be receiving a start request. For example, the electronic control unit 508 may require the park switch 516 and/or the neutral switch 518 to be activated.

The electronic control unit 510 suitably instructs the relay unit 510 to start the engine of the vehicle by providing it with one or more relay signals 522, such as a first relay signal 522a and a second relay signal 522b. These relay signals 522 suitably provide power received from the ignition 502 a path to ground. Therefore, when the vehicle is not attempting to start, the relay signals 522 are suitably pulled high.

To ensure a proper startup of the vehicle, the electronic control unit 510 may monitor one or more of the relay unit 510 and the relay signals 522 for problems. If problems are detected, the electronic control unit 510 may take one or more actions. Said actions may include one or more of preventing startup of the vehicle, terminating existing attempts to start the vehicle, notifying an operator of the vehicle, and the like.

As to monitoring the relay unit 510, the electronic control unit 510 may receive a diagnosis signal 524 from the relay unit 510 facilitating the detection of welded relays (i.e., relays stuck in the ON position). In certain embodiments, if the relay unit 510 is functioning properly, the diagnosis signal 524 will include a voltage (e.g., 2.5V) designated by an input circuit of the electronic control unit 508, and, if the relay unit 510 is not functioning properly, the diagnosis signal 524 will be pulled high or low.

As to monitoring the relay signals 522 the electronic control unit 508 may monitor the relay signals 522 provided to the relay unit 510 so as to ensure the relay signals 522 are as expected. In other words, one or more feedback loops may be employed. If problems are detected, the electronic control unit 508 may end its attempt to start the vehicle.

The relay unit 510 provides power to the starter 512 and may be activated by the correct combination of states of one or more of the electronic control unit 508, the ignition 502, the automatic transmission 504, and the like. Suitably, the relay unit 510 requires the inhibitor switch 520 to be activated, the ignition 502 to provide power, and the electronic control unit 508 to instruct the relay unit 510 to start the vehicle. The instructions may be passed by way of the relay signals 522.

The relay unit 510 suitably includes three relays passing power from the energy storage device 506 to the starter 512: a first relay 526, a second relay 528, and a third relay 530. In such embodiments, the first relay 526 and the second relay 528 of the relay control unit 510 may be configured to activate based on the first relay signal 522a and power from the ignition 502 and the second relay signal 522b and power form the ignition 502, respectively; the inputs to the first relay 526 and the second relay 528 may be provided power from the energy storage device 506; the output of the first relay 526 may be used to provide power to the input of a third relay 530; the output of the second relay 528, in conjunction with the inhibitor switch 520, may be used to activate the third relay 530; and the output of the third relay 530 may be used to activate the starter 512.

In certain embodiments, the relay unit 510 further provides the electronic control unit 508 with the diagnosis signal 524. Suitably, the diagnosis signal 524 is used as the input of the third relay 530 and/or the output of the first relay 526. Using the diagnosis signal 524, the electronic control unit 508 can detect failures with the relays and/or the inhibitor switch 520.

Assuming the vehicle is not attempting to start and the inhibitor switch 520 is activated, the diagnosis signal 524 will be pulled high and/or pulled low when one or more of the first relay 526, the second relay 528, and the third relay 530 become stuck in the ON position (i.e., welded). As to the first relay 526, the diagnosis signal 524 will be pulled high if the first relay 526 becomes stuck in the ON position. As to the second relay 528 and the third relay 530, the diagnosis signal 524 will be pulled low if the second relay 528 or the third relay 530 become stuck in the ON position. Assuming the ignition 502 is providing power and the second relay signal 522b is pulled low by the ECU, the diagnosis signal 524 will be pulled low if the inhibitor switch 520 becomes stuck in the ON position.

The starter 512 provides the necessary mechanical energy to crank the engine of the vehicle and suitably includes a motor 532 and a relay 534, where the relay 534 provides power received from the energy storage device 506 to the motor 532. In certain embodiments, the relay 534 may be activated by the output of the third relay 530.

The disclosure has been made with reference to preferred embodiments. Obviously, modifications and alterations will occur to others upon reading and understanding the preceding detailed description. It is intended that the preferred embodiments be construed as including all such modifications and alterations insofar as they come within the scope of the appended claims or the equivalents thereof.

The invention claimed is:

1. A starter relay structure for a vehicle, wherein the starter relay structure is controlled by an electronic control unit of the vehicle, said starter relay structure comprising:
a first relay and a second relay activated by one or more relay signals from the electronic control unit; and,
a third relay activated by an output of the second relay, wherein an output of the first relay is provided as an input to the third relay.

2. The starter relay structure of claim 1, wherein the output of the first relay and/or the input of the third relay is provided to the electronic control unit as a diagnosis signal.

3. The starter relay structure of claim 2, wherein the diagnosis signal is pulled high when the first relay fails in an ON position.

4. The starter relay structure of claim 2, wherein the diagnosis signal is pulled low when the second relay fails in an ON position and one of a clutch switch and an inhibitor switch is activated.

5. The starter relay structure of claim 2, wherein the diagnosis signal is pulled low when the third relay fails in an ON position.

6. The starter relay structure of claim 1, wherein an input to the first relay and the second relay is provided by an energy storage device without any switches intermediate the first relay and the energy storage device and without any switches intermediate the second relay and the energy storage device.

7. The starter relay structure of claim 1, wherein an output of the third relay activates a starter of the vehicle.

8. The starter relay structure of claim 1, wherein the electronic control unit provides an ignition signal to the first relay and the second relay via the relay signals upon receiving a start request from a power control unit.

9. The starter relay structure of claim 1, wherein the first relay and the second relay are activated by a combination of the relay signals and an ignition signal, wherein the relay signals provide power received from the ignition signal with a path to ground.

10. The starter relay structure of claim 1, wherein the electronic control unit monitors the relay signals.

11. A starter system for a vehicle, said system comprising:
a clutch switch;
an electronic control unit and a power control unit that each monitor the clutch switch; and,
a relay unit that isolates the clutch switch between the electronic control unit and the power control unit;
wherein the clutch switch must be activated to start the vehicle.

12. The starter system of claim 11, further comprising:
a starter activated by the relay unit, wherein the electronic control unit activates the relay unit using an ignition signal from the power control unit via a relay signal.

13. The starter system of claim 12, wherein the electronic control unit monitors the relay signal.

14. The starter system of claim 12, wherein the electronic control unit provides the relay signal to the relay unit only when it receives a start request from the power control unit.

15. The method of claim 12, wherein the power control unit provides the ignition signal only when a user of the vehicle authenticates.

16. The starter system of claim 11, wherein the relay unit includes:
- a first relay and a second relay both activated by a relay signal from the electronic control unit; and,
- a third relay activated by an output of the second relay, wherein an output of the first relay is provided as an input to the third relay.

17. The starter system of claim 16, wherein an output of the first relay and/or an input of the third relay is provided to the electronic control unit as a diagnosis signal.

18. The starter system of claim 16, wherein the starter is activated by an output of the third relay.

19. A starter system for an automatic transmission vehicle, said system comprising:
- an inhibitor switch activated when a transmission of the automatic transmission vehicle is in one of park and neutral;
- an electronic control unit that starts the automatic transmission vehicle and facilitates diagnosis of the starter system; and,
- a relay unit comprising:
  - a first relay and a second relay activated by an ignition signal and a plurality of relay signals from the electronic control unit; and,
  - a third relay activated when both the second relay and the inhibitor switch are activated.

20. The starter system of claim 19, wherein an output of the first relay is provided as an input to the third relay.

* * * * *